May 23, 1961         E. C. ELSNER         2,984,885
RELEASABLE ATTACHMENT FITTING
Filed Feb. 29, 1960
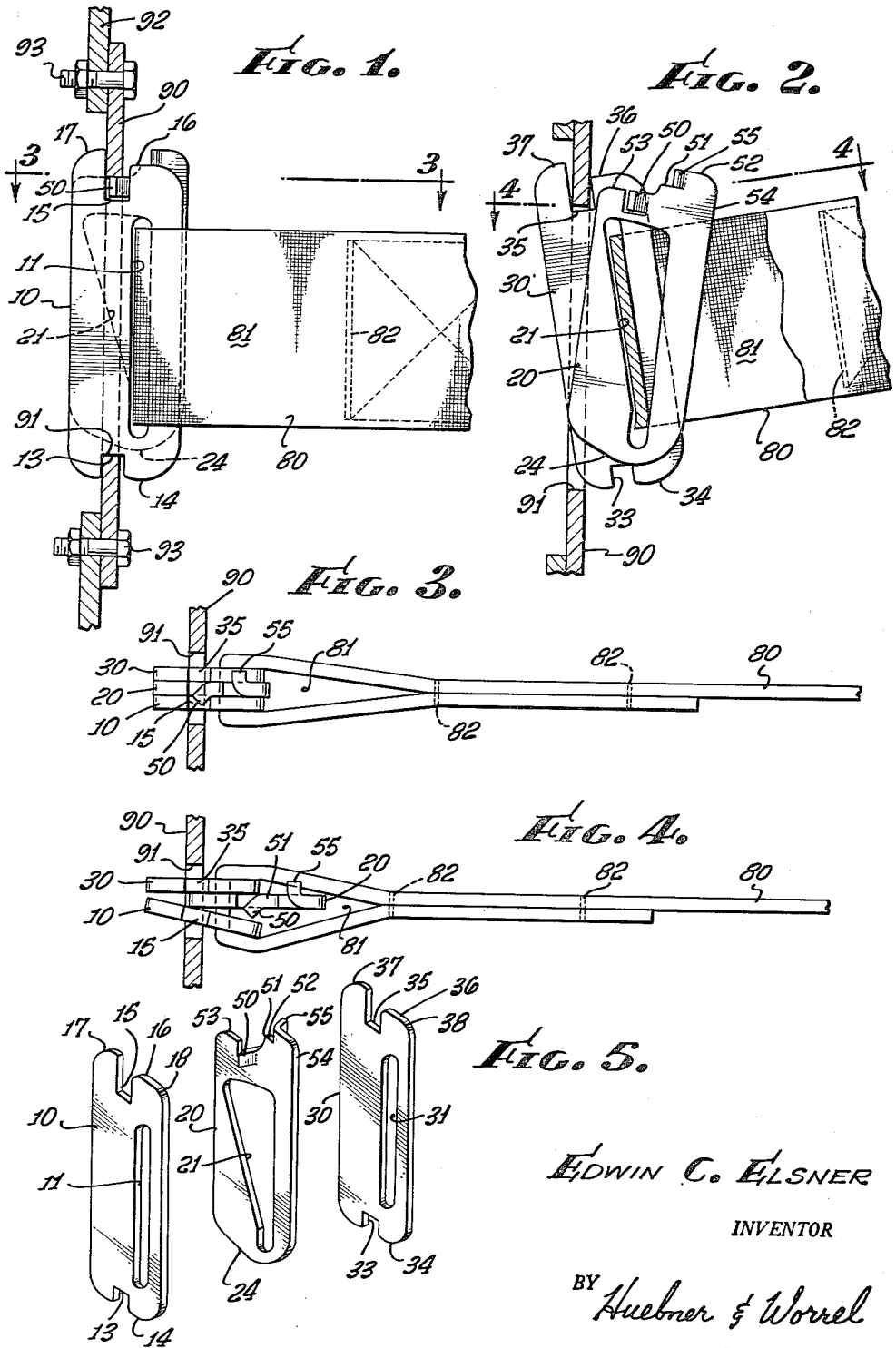
EDWIN C. ELSNER
INVENTOR
BY Huebner & Worrel
ATTORNEYS

United States Patent Office 2,984,885
Patented May 23, 1961

2,984,885

RELEASABLE ATTACHMENT FITTING

Edwin C. Elsner, Pasadena, Calif., assignor to Aeroquip Corporation, Jackson, Mich., a corporation of Michigan Filed Feb. 29, 1960, Ser. No. 11,892

4 Claims. (Cl. 24—265)

This invention relates to an attachment fitting used to releasably attach a length of strap or webbing, by means of an anchor member, to a ceiling, floor, wall or partition.

This application is a continuation-in-part of the application, Serial No. 852,313, in the name of Edwin C. Elsner, titled "Self-Locking Releasable Fastener," filed November 12, 1959.

The attachment fitting of the present invention is intended primarily for use with a length of strap or webbing to tie down cargo by securing the attachment fitting and a length of strap or webbing on which it is mounted to the ceiling, floor, walls, or partitions of the cargo space of a vehicle. Generally, such an attachment fitting is secured to an anchor member on the ceiling, floor, wall or partition. The anchor member may be a slotted plate mounted substantially flush to the surface of said ceiling, floor, wall or partition, or it may be a track having a plurality of slotted openings, and similarly mounted on said ceiling, floor, wall or partition.

An object of the present invention is to provide such an attachment fitting which may be locked firmly into position on an anchor member under load tension so as to prevent inadvertent removal from contact with the anchor member during transportation.

It is another object of the invention to provide such an attachment fitting which, although capable of being locked firmly in position on an anchor member, may still be readily unlocked and removed from such anchor member when cargo tiedown is no longer desired.

It is still another object of the invention to provide such a device which may be quickly and easily released from locked position without damage to the strap or webbing on which it is mounted.

A still further object of the invention is to provide such an attachment fitting which is sturdy in construction but simple in design.

Still another object of the invention is to provide such an attachment fitting which has a minimal number of parts, and which is easy and inexpensive to manufacture and assemble.

Other and more specific objects and advantages will appear and be brought out more fully in the following specification considered with reference to the accompanying drawings throughout which like parts are designated by like numerals.

In the drawings:

Figure 1 is a vertical cross-sectional view of the fitting in locked position on an anchor member.

Figure 2 is a view similar to Figure 1, but with the fitting in the process of insertion into the anchor member.

Figure 3 is a cross-sectional view taken on the line 3—3 of Figure 1.

Figure 4 is a cross-sectional view taken on the line 4—4 of Figure 2.

Figure 5 is a perspective view of the parts of the fitting.

Plates 10, 20 and 30 have formed therein aligned slotted openings 11, 21 and 31, respectively. Slots 11 and 31 are relatively long and narrow, and of a size to accommodate a length of strap or webbing as hereinafter mentioned. On the other hand, slotted opening 21 in plate 20 is of modified triangular configuration. It is of approximately the same length as slotted openings 11 and 31, but is substantially wider at one end thereof, due to its modified triangular configuration. Plates 10 and 30 are of approximately the same size, whereas, plate 20 is somewhat shorter, but of substantially the same width.

An open-ended notch or U-shaped cut 13 is formed at one end 14 of plate 10 intermediate the ends thereof. A second open-ended notch 15 is formed at the other end 16 of plate 10 intermediate the ends thereof. Said notch 15 is substantially deeper than notch 13. Similarly, an open-ended notch or U-shaped cut 33 is formed at one end 34 of plate 30 intermediate the ends thereof, and said notch 33 corresponds to notch 13 in plate 10, while a second open-ended notch 35, substantially deeper than notch 33, is formed at the other end 36 of plate 30 intermediate the ends thereof, and said notch 35 corresponds to notch 15 in plate 10.

If desired, ends 16 and 36 may be stepped so that edges 17 and 37 thereof respectively form protruding shoulders.

Plate 20 does not have a notch or cut corresponding to grooves 13 and 33 in plates 10 and 30 respectively. End 24 of plate 20 is preferably formed on a biased angle so that when the device is mounted in the manner hereinafter described, end 24 will be clear of aligned grooves 13 and 33.

An obliquely protruding latching means or tang 50 is formed on end 51 of plate 20 intermediate the ends thereof and disposed so as to seat in notch 15 of plate 10 when the device is in locked position. End 51 of plate 20 may also be stepped, so that one side 52 thereof protrudes from the plane of the other side 53 thereof. Formed adjacent the inner end 54 of plate 20 is a second obliquely protruding tang or other abutting means 55, which protrudes in the opposite direction to tang 50, and is disposed so as to abut against outer edge 38 of end 36 of plate 30.

It will be recognized that tang 50 may be disposed so as to seat in notch 35 of plate 30 instead of in notch 15 of plate 10, when the device is in locked position, and that, similarly, tang 55 may be disposed so as to abut against the outer edge 18 of end 16 of plate 10, instead of edge 38 of end 36 of plate 30, if so desired.

One end of a length of strap or webbing 80 is passed through aligned slots 11, 21 and 31, is then doubled back on itself, to form a bight 81, and is secured to itself by any suitable means, such as by stitching 82.

An anchor member 90, having a slotted opening 91, is mounted on side walls, ceiling, floor, or roof 92 of a cargo compartment, by any suitable means, such as by a nut and bolt combination 93. Slotted opening 91 is of sufficient size to readily accommodate the device of the present invention, to anchor it, and to permit ready removal, all as hereinafter described.

In operation, plates 10, 20 and 30, in overlying relationship to each other, and with strap or webbing 80 disposed in aligned slots 11, 21 and 31, is brought into position adjacent slotted opening 91 in anchor member 90. Plate 20 is revolved in relation to plates 10 and 30, so that tang 50 is removed from notch 15 and notches 15 and 35 are aligned, without interference from plate 20. Notches 13 and 33 are similarly aligned. The device is then moved into the position best illustrated in Figure 2, with edges 17 and 37 inserted in slotted opening 91, and with anchor member 90 disposed in aligned slots 15 and 35. The device is then moved from the oblique position shown in Figure 2, by moving aligned ends 14 and 34 through slotted opening 91 until aligned notches 13 and 33 are in straddling position over anchor member 90, whereupon the device is lowered until anchor member 90 is disposed in aligned notches 13 and 33 and the device is thus seated. Thereupon, plate 20 is rotated in the opposite direction to its first movement, until tang 50 is disposed in notch 15 of plate 10, and tang 55 is in abutting position against outer edge 38 of end 36 of plate 30, and the device has assumed the position shown in Figure 1. It is obvious that the device is then in locked position, because, if pull tension is applied to webbing 80, shouldered edges 17 and 37, as well as the inner sides of notches 13 and 33, will be in abutting position on the inside surface of anchor member 90, and locked against substantial movement by reason of the position of tang 50 disposed in notch 15. Similarly, if pull tension on webbing 80 is relaxed, movement of the device in the opposite direction will be arrested by the abutment of tang 55 on edge 38.

When it is desired to release the attachment fitting from the anchor member, pressure is applied to tang 55 to move it out of abutting position against edge 38, whereupon, tang 50 will be moved out of notch 15, and plate 20, riding on the protruding edge of tang 50, will be moved out of alignment with plates 10 and 30, freeing notches 15 and 35. The attachment fitting may then be moved upwardly until the upper lip of slotted opening 91 is fully seated in notches 15 and 35, free of any interference from plate 20. The attachment fitting may then be turned to assume the position illustrated in Figure 2, and thereafter may be obliquely removed from slot 91 and from all contact with anchor member 90.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

What is claimed is:

1. A releasable fitting for attaching a length of strap or webbing to an anchor which comprises: a pair of elongate parallel plates spaced apart from each other, each of said plates having an aligned notch at one end thereof and a deeper aligned notch at the other end thereof, each of said plates having an aligned elongate slotted opening in the body thereof; a third elongate parallel plate disposed between said first plates so that all of said plates overlie each other, said third plate having an aligned elongate slotted opening in the body thereof which is wider than said openings in said first plates; latch means on said third plate disposed so as to be received in the deeper aligned notch of one of said first plates; and an abutment on said third plate disposed so as to abut on the edge of the other of said first plates.

2. A releasable fitting for attaching a length of strap or webbing to an anchor as defined in claim 1, wherein said aligned slotted openings in the plates are of substantially the same length so as to accommodate the bight of a length of strap or webbing.

3. A releasable fitting for attaching a length of strap or webbing to an anchor as defined in claim 1, wherein said latch means comprises an obliquely protruding tang.

4. A releasable fitting for attaching a length of strap or webbing to an anchor as defined in claim 1, wherein said abutment comprises an obliquely protruding tang.

References Cited in the file of this patent

UNITED STATES PATENTS 2,877,529   Elsner _____ Mar. 17, 1959